(12) United States Patent
Paul

(10) Patent No.: US 6,981,078 B2
(45) Date of Patent: Dec. 27, 2005

(54) FIBER CHANNEL ARCHITECTURE

(75) Inventor: Harry V. Paul, Haddonfield, NJ (US)

(73) Assignee: Computer Network Technology Corporation, Minneapolis, MN (US)

(*) Notice: Subject to any disclaimer, the term of this patent is extended or adjusted under 35 U.S.C. 154(b) by 322 days.

(21) Appl. No.: 09/922,591

(22) Filed: Aug. 3, 2001

(65) Prior Publication Data
US 2002/0023184 A1 Feb. 21, 2002

Related U.S. Application Data

(60) Provisional application No. 60/223,522, filed on Aug. 7, 2000.

(51) Int. Cl.[7] .............................................. G06F 13/00
(52) U.S. Cl. ....................... 710/100; 361/736; 370/402
(58) Field of Search ................................ 710/107, 100; 370/351, 389, 400, 401, 402, 392

(56) References Cited

U.S. PATENT DOCUMENTS

| | | | |
|---|---|---|---|
| 4,821,034 A | 4/1989 | Anderson et al. | 340/825.8 |
| 5,455,917 A | 10/1995 | Holeman et al. | 395/287 |
| 5,533,201 A * | 7/1996 | Benton et al. | 710/100 |
| 5,603,044 A | 2/1997 | Annapareddy et al. | 395/800 |
| 5,793,919 A | 8/1998 | Payne et al. | 385/135 |
| 5,844,887 A | 12/1998 | Oren et al. | 370/218 |
| 5,892,932 A | 4/1999 | Kim | 395/311 |
| 5,983,260 A | 11/1999 | Hauser et al. | 709/201 |
| 5,991,295 A | 11/1999 | Tout et al. | 370/376 |
| 5,999,527 A | 12/1999 | Petersen | 370/360 |
| 6,032,209 A | 2/2000 | Mros et al. | 710/103 |
| 6,049,542 A | 4/2000 | Prasad | 370/386 |
| 6,067,286 A | 5/2000 | Jones et al. | 370/218 |
| 6,078,503 A | 6/2000 | Gallagher et al. | 361/725 |
| 6,138,185 A | 10/2000 | Nelson et al. | 710/33 |
| 6,160,813 A | 12/2000 | Banks et al. | 370/422 |
| 6,185,203 B1 | 2/2001 | Berman | 370/351 |
| 6,335,992 B1 * | 1/2002 | Bala et al. | 385/17 |

(Continued)

FOREIGN PATENT DOCUMENTS

EP 0959591 5/1999

(Continued)

OTHER PUBLICATIONS

Rathgeb, E.P., "Redundancy Concepts for a Large ATM Switching Node" Iss '97, vol. 1, Sep. 21, 1997, pp. 425-433.

(Continued)

Primary Examiner—Rehana Perveen
Assistant Examiner—Clifford Knoll
(74) Attorney, Agent, or Firm—Beck & Tysver, P.L.L.C.

(57) ABSTRACT

A fiber channel backplane configuration is capable of modular expansion, e.g., from 64 ports to 128 ports or 256 ports by a simple operation. The backplane includes connectors that provide permanent and jumper/vertical connections to support 64 user port switch in a single chassis. For a 128 port switch, two 64 port chassis are used. In the 128 port configuration, the connectors are configured to provide permanent and jumper/vertical connections to make intra-chassis and inter-chassis connections between the fabric switch and fabric input/output boards. Using jumper plugs, the jumper connectors provide vertical connections between the fiber input/output boards and fiber switch boards of two chassis. For a 256 port switch configuration, four 64 port chassis assemblies are used. The connectors are configured to provide each switch with permanent, vertical, horizontal, and diagonal connections to the fiber input/output boards of each of the four chassis.

31 Claims, 11 Drawing Sheets

U.S. PATENT DOCUMENTS 6,370,145 B1 * 4/2002 Dally et al. ................. 370/400
6,606,656 B2 * 8/2003 Carvey et al. .............. 709/220

FOREIGN PATENT DOCUMENTS

EP        1016980       12/1999

OTHER PUBLICATIONS

Fischer W., et al., "A Scalable ATM Switching System Architecture" IEEE Journal on Selected Areas in Communications, vol. 9, Oct. 1, 1991, pp. 1299-1307.

* cited by examiner

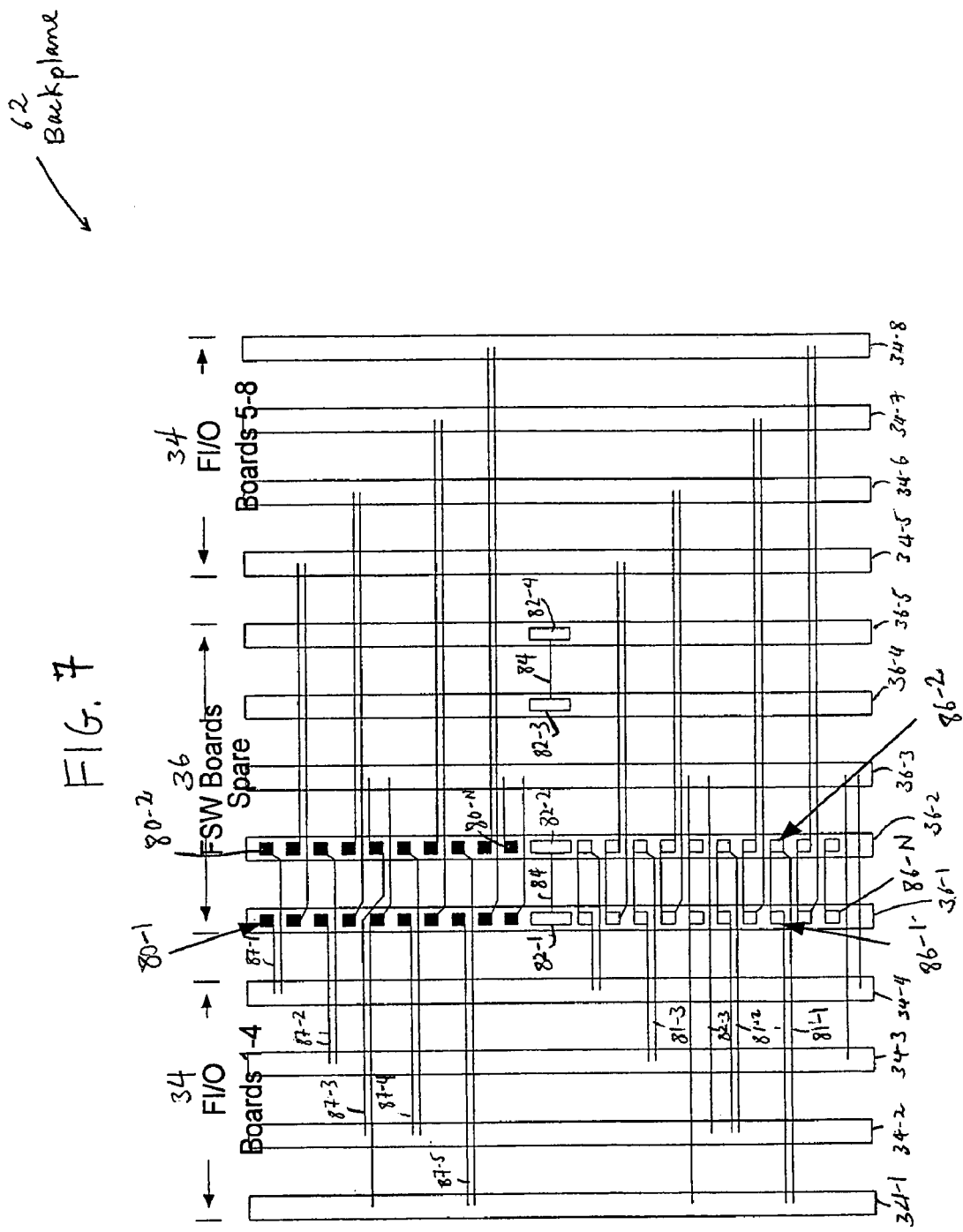

FIBER CHANNEL ARCHITECTURE

RELATED APPLICATION(S)

This application claims the benefit of U.S. Provisional Application No. 60/223,522, filed Aug. 7, 2000, entitled "Fibre Channel Architecture," by Harry V. Paul, the entire teachings of all are incorporated herein by reference.

BACKGROUND

Mainframes, super computers, mass storage systems, workstations and very high resolution display subsystems are frequently connected together to facilitate file and print sharing. Common networks and channels used for these types of connections oftentimes introduce communications bottle necking, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions.

One type of communications interconnect that has been developed is fibre channel. The fibre channel protocol was developed and adopted as the American National Standard for Information Systems (ANSI). See Fibre Channel Physical and Signaling Interface, Revision 4.3, American National Standard for Information Systems (ANSI) (1994) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of transmitting frames at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fibre and copper cable.

The fibre channel industry indicates that the information explosion and the need for high-performance communications for server-to-storage and server-to-server networking have been the focus of much attention during the 90s. Performance improvements in storage, processors, and workstations, along with the move to distributed architectures such as client/server, have spawned increasingly data-intensive and high-speed networking applications. The interconnect between these systems and their input/output devices demands a new level of performance in reliability, speed, and distance. Fibre channel, a highly-reliable, gigabit interconnect technology allows concurrent communications among workstations, mainframes, servers, data storage systems, and other peripherals using SCSI and IP protocols. It provides interconnect systems for multiple topologies that can scale to a total system bandwidth on the order of a terabit per second. Fibre channel delivers a new level of reliability and throughput. Switches, hubs, storage systems, storage devices, and adapters are among the products that are on the market today, providing the ability to implement a total system solution.

IT systems frequently support two or more interfaces, and sharing a port and media makes sense. This reduces hardware costs and the size of the system, since fewer parts are needed. Fibre channel, a family of ANSI standards, is a common, efficient transport system supporting multiple protocols or raw data using native fibre channel guaranteed delivery services. Profiles define interoperable standards for using fibre channel for different protocols or applications.

Fibre channel, a channel/network standard, contains network features that provide the required connectivity, distance, and protocol multiplexing. It also supports traditional channel features for simplicity, repeatable performance, and guaranteed delivery. Fibre channel also works as a generic transport mechanism.

Fibre channel architecture represents a true channel/network integration with an active, intelligent interconnection among devices. A fibre channel port provides management of a simple point-to-point connection. The transmission is isolated from the control protocol, so that point-to-point links, arbitrated loops, and switched topologies are used to meet the specific needs of an application. The fabric is self-managing. Nodes do not need station management, which greatly simplifies implementation.

FIG. 1 illustrates a variable-length frame 11 as described by the fibre channel standard. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

FIG. 2 illustrates a block diagram of a representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e., fibre channel switch). The fabric 110 is an entity that interconnects various node-ports (N-ports) 140 and their associated workstations, mainframes and peripherals attached to the fabric 110 through the F-ports 142. The essential function of the fabric 110 is to receive frames of data from a source N-port and, using a first protocol, route the frames to a destination N-port. In a preferred embodiment, the first protocol is the fibre channel protocol. Other protocols, such as the asynchronous transfer mode (ATM) could be used without departing from the scope of the present invention.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," or fibre channel switch to connect devices. The fabric includes a plurality of fabric-ports (F-ports) that provide for interconnection and frame transfer between a plurality of node-ports (N-ports) attached to associated devices that may include workstations, super computers and/or peripherals. The fabric has the capability of routing frames based upon information contained within the frames. The N-port manages the simple point-to-point connection between itself and the fabric. The type of N-port and associated device dictates the rate that the N-port transmits and receives data to and from the fabric. Transmission is isolated from the control protocol so that different topologies (e.g., point-to-point links, rings, cross point switches) can be implemented.

The fibre channel industry standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer does not require allocation of a path through the network switch for each transfer of a single frame from one network element to another.

SUMMARY

With the advent of widespread use of fibre channel protocols, expandability of a backplane or fibre channel chassis so that an existing backplane can be used through multiple upgrades in service and size is highly desirable. Presently available fibre channel backplane configurations have not been capable of such expansion. The capability for expansion is believed to be especially important in the case of storage area networks (SANs).

The present invention relates generally to switching elements for network applications, and in particular to methods and apparatus for a fibre channel switch that can be universally expanded as needed for various applications.

In accordance with the invention, the fibre channel switch comprises a plurality of input/output modules, a plurality of fabric switch modules, and a backplane receiving the input/output modules and the fabric switch modules. Each input/output module has a plurality of fibre channel ports, e.g., 8 fibre channel ports. The plurality of fabric switch modules provide fabric switches having switching capacity. The plurality of fabric switch modules can be arranged to provide fabric switches of various switching capacity. The backplane comprises connectors to provide connectivity between the plurality of input/output modules and the plurality of fabric switch modules. The backplane provides connectivity to another backplane receiving a plurality of input/output modules and a plurality of fabric switch modules, to expand the fibre channel switch. In particular, the connectors can be configured to provide connections between the input/output modules and fabric switch modules of both backplanes.

In one embodiment of present invention, the fibre channel switch comprises a chassis including a plurality of input/output modules, a plurality of fabric switch modules, and a backplane having connectors to provide connectivity between the input/output modules and the fabric switch modules. The backplane includes permanent connectors and jumper connectors to provide connections between each fabric switch and the plurality of input/output modules. Each fabric switch module is arranged to provide two fabric switches. The single chassis switch provides up to 64 port fibre channel ports.

The fibre channel switch comprises two 64 port chassis to provide up to 128 fibre channel ports. Each chassis comprises a plurality of input/output modules, a plurality of fabric switch modules, and a backplane having connectors to provide connectivity between the input/output modules and the fabric switch modules of both chassis. The backplane of each chassis includes permanent connectors and jumper connectors to provide permanent and vertical connections to each fabric switch. The permanent connections provide connections between each fabric switch and the input/output modules of the same chassis. The vertical connections provide connections between each fabric switch of one chassis and the input/output modules of the other chassis. Each fabric switch module provides one fabric switch.

The fibre channel switch comprises four 64 port chassis to provide up to 256 fibre channel ports. The backplane of each chassis includes permanent connectors, jumper connectors, horizontal fabric switch connectors, and diagonal fabric switch connectors to provide permanent, vertical, horizontal, and diagonal connections to each fabric switch. In this configuration, two fabric switch boards support one fabric switch. For each switch, one of the two fabric switch boards provides permanent connections to the input/output modules of the same chassis and vertical connections to the input/output modules of second chassis. The other fabric switch board employs jumper connectors and permanent connectors to provide horizontal and diagonal connections between the fabric switch and the input/output modules of third and fourth chassis. The input/output modules of the horizontal and diagonal chassis are provided to each fabric switch by using the horizontal fabric switch connectors and diagonal fabric switch connectors. Similarly, all the fabric switches and input/output modules are interconnected.

Accordingly, the present invention is directed to a fibre channel backplane configuration that is capable of modular expansion (e.g., from 64 ports to 128 ports or 256 ports) by a simple operation. Further, a novel method of expanding a fibre channel (or other director) switch by a simple operation, and in some cases, by a single operation is provided.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a block diagram of a backplane having permanent connection, jumper connection, and switch expansion sites, illustrating a backplane interconnect configuration according to the invention;

DETAILED DESCRIPTION OF A PREFERRED EMBODIMENT

The present invention is directed to a fibre channel switch which incorporates features whereby the backplane thereof is capable of providing connectivity for 64 ports to 128 ports, or even to 256 ports.

Figure 1:
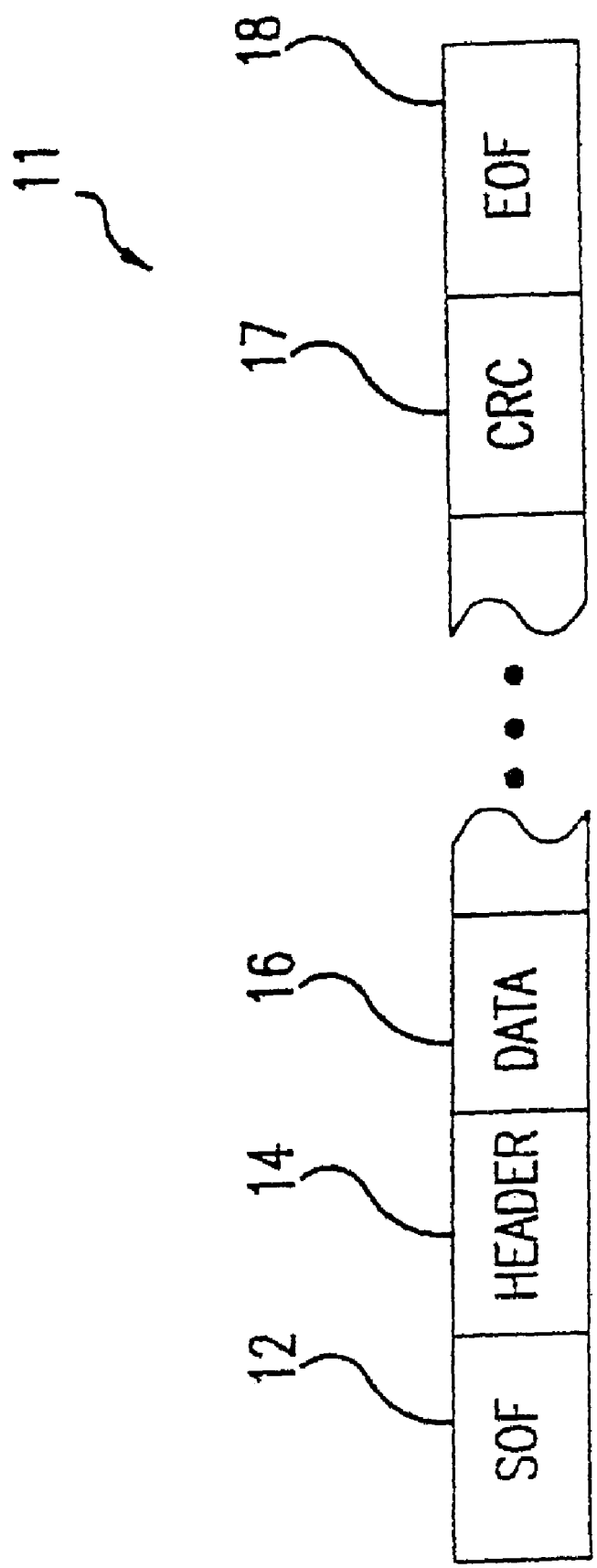
FIG. 1 illustrates a variable-length frame as described by the fibre channel standard.
Figure 2:
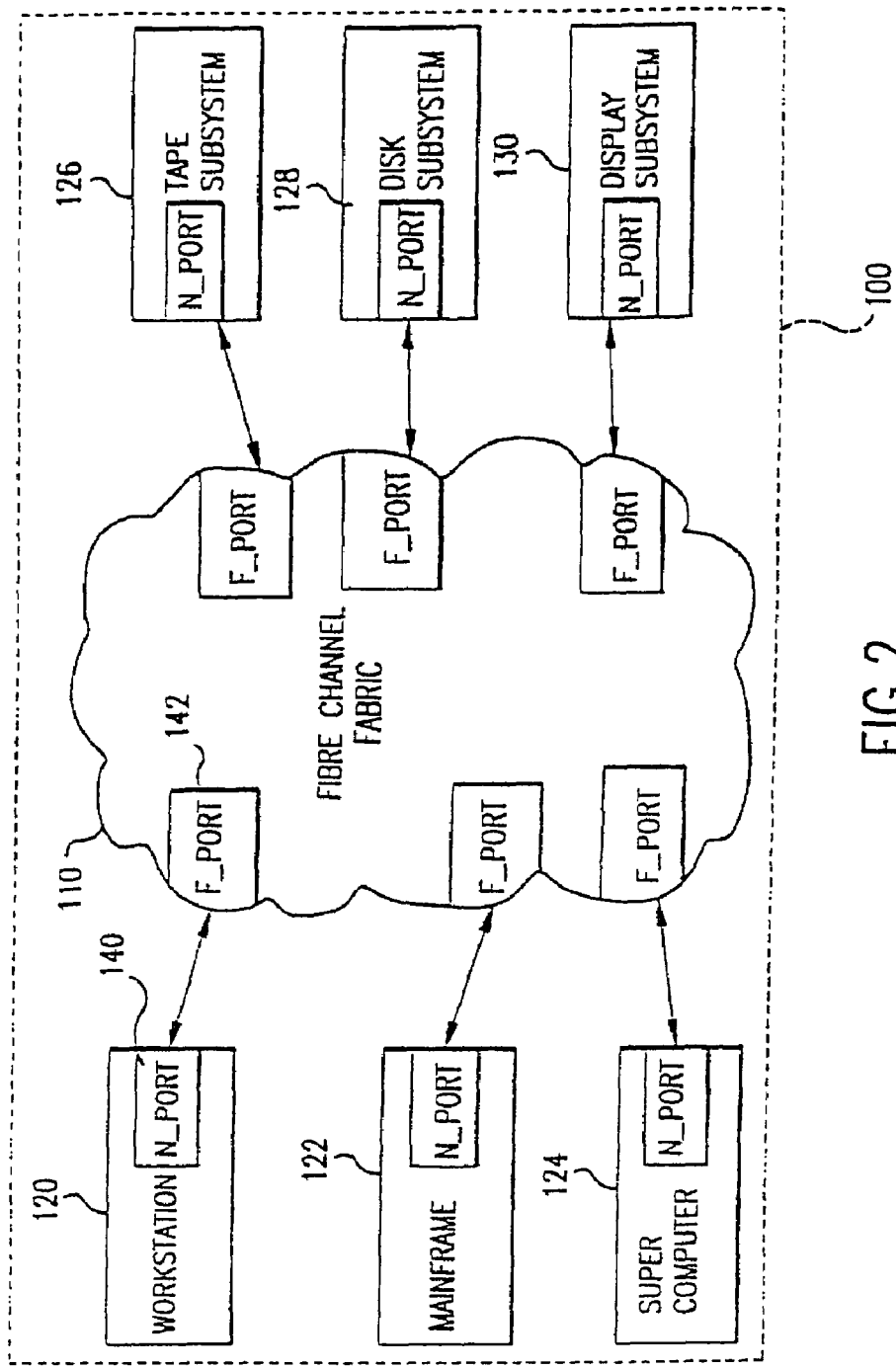
FIG. 2 is a block diagram of a representative fibre channel architecture in a fibre channel network.
Figure 3:
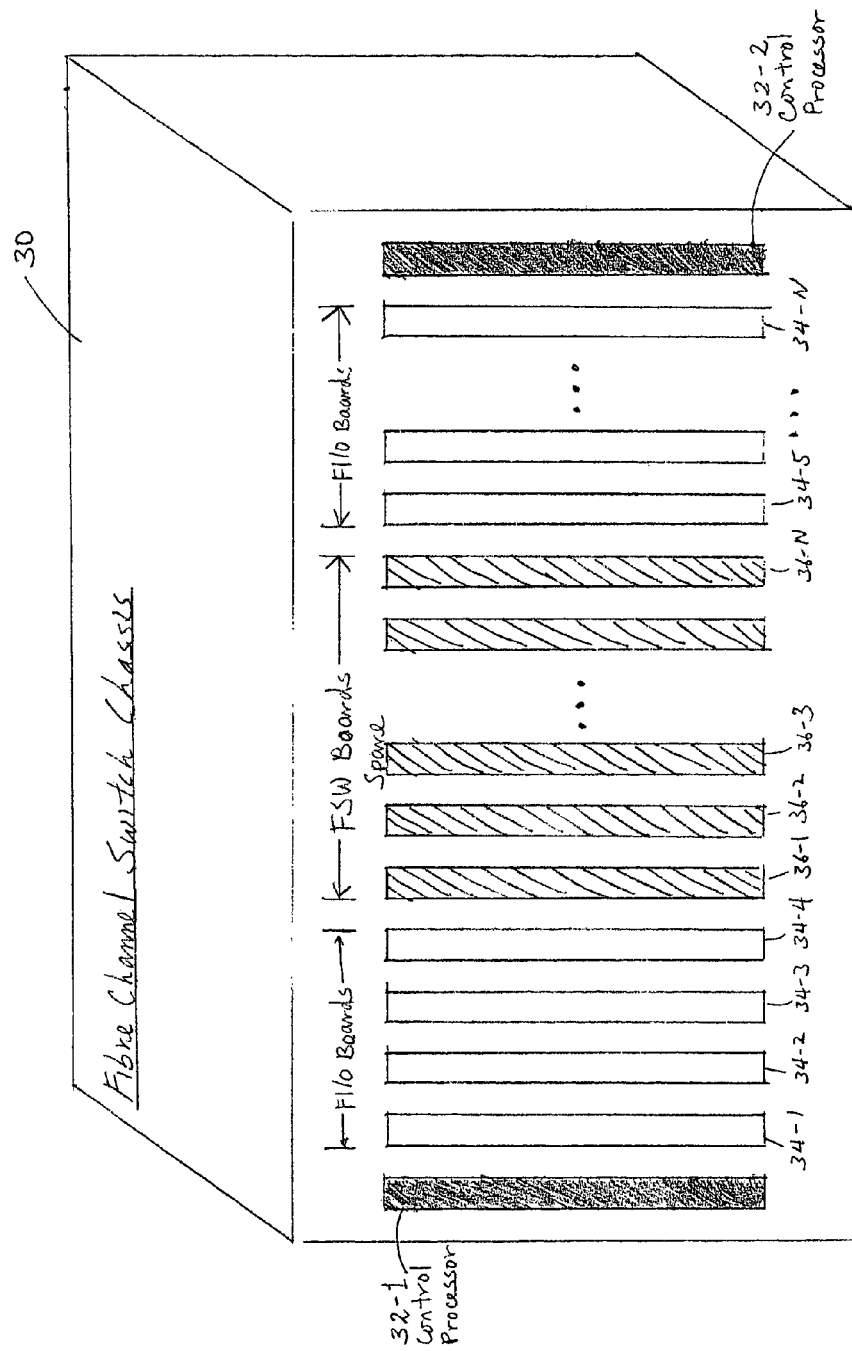
FIG. 3 is a front perspective view of a chassis including components of a fibre channel switch according to the invention.

FIG. 3 is a front perspective view of a chassis 30 including components of a fibre channel switch according to the invention. The chassis 30 includes fibre channel I/O (FI/O) boards 34, fabric switch (FSW) boards 36, and control processors 32. The chassis 30 also includes a backplane and wiring, described further herein, to provide connections between the control processors 32, FI/O 34 and FSW boards 36.

Figure 4:
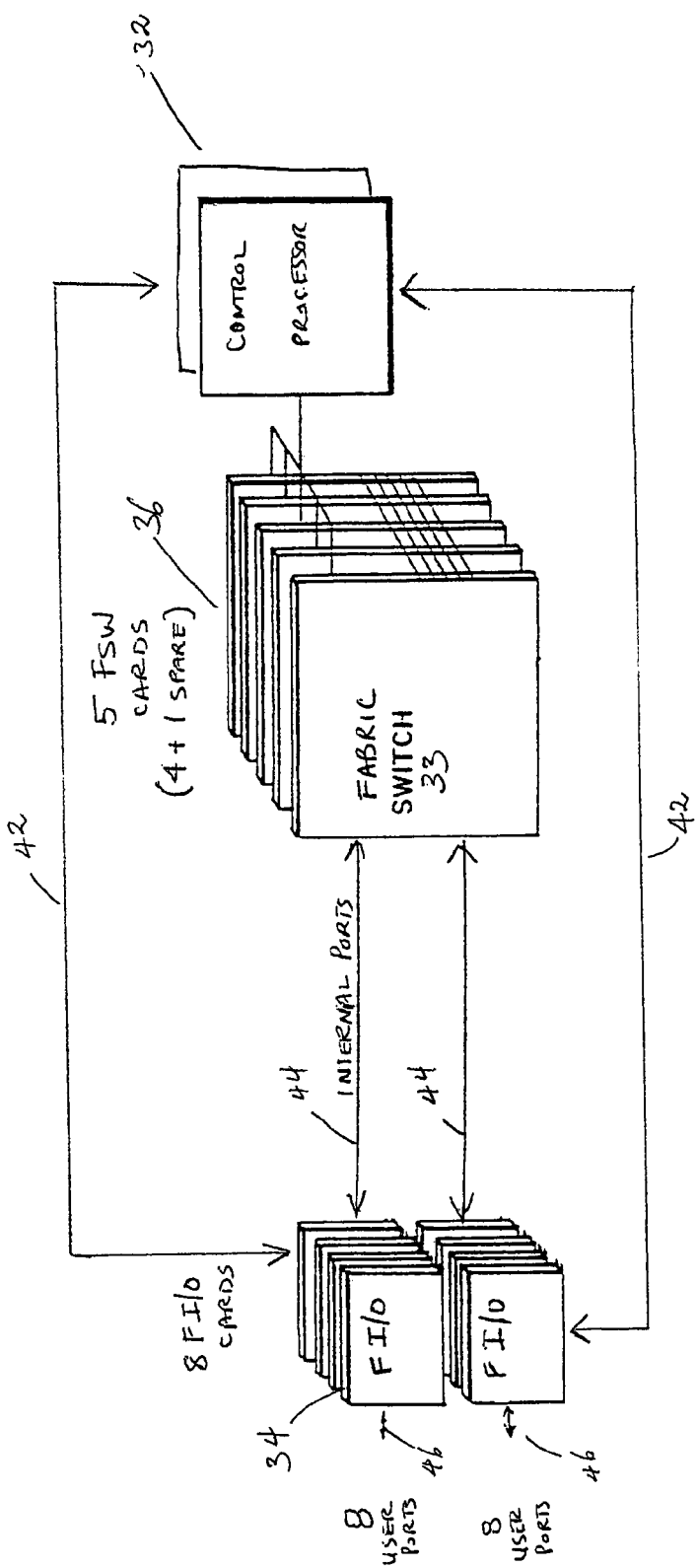
FIG. 4 is a block diagram showing a fibre channel switch arrangement of the fibre channel components in the chassis of FIG. 3.

FIG. 4 is a block diagram showing a fibre channel switch arrangement of the fibre channel components in the chassis 30 of FIG. 3. The switch arrangement, as shown, is configured to support 64 user ports and includes eight FI/O boards 34, each FI/O board providing 8 user ports. A switching fabric 33 comprises five FSW boards 36, from which 4 are active and 1 is spare. The FI/O boards 34 are connected to the FSW boards 36. The connections 44 between the FI/O and FSW boards 35 transport fibre channel data at a rate of 1 to 2 gigabits per second. The path to a destination port is predetermined, i.e., programmed into the hardware of the FSW itself. The FI/O boards 34 are also connected to a pair of redundant control processors 32. The connections 42 between the FI/O boards and control processors 32 transport 100 Mbit Ethernet pairs.

Figure 5:
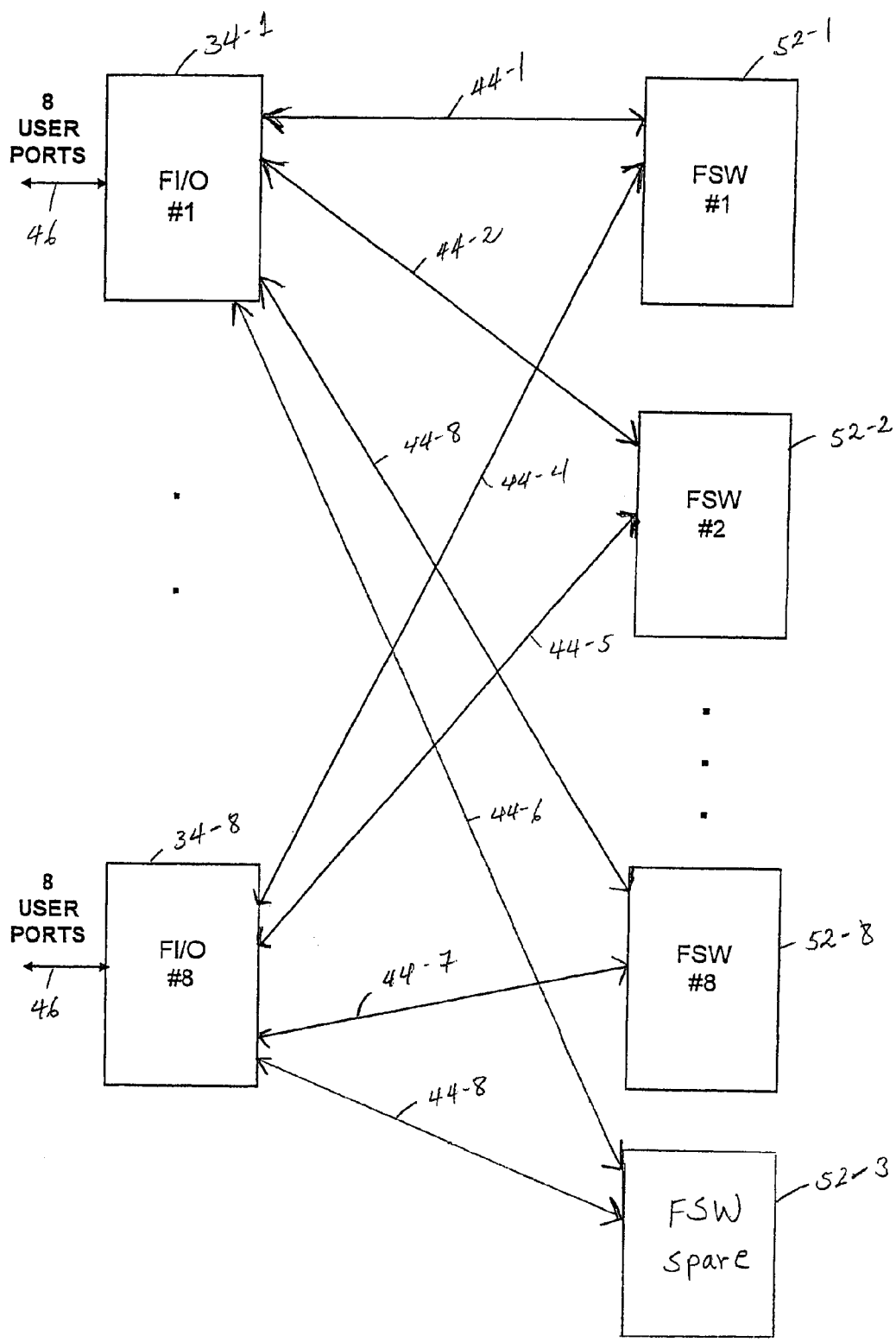
FIG. 5 illustrates a full mesh interconnect configuration between fibre channel I/O boards and switches for the switch arrangement of FIG. 4.

FIG. 5 illustrates a full mesh interconnect scheme between FI/O boards 34 and fabric switches 52 for the 64 port switch arrangement of FIG. 4. Each FSW board 36 is logically decoupled to provide two 8×8 switches 52. For example, FSW board 36-1 (FIG. 4) is logically arranged to provide two 8×8 switches 52-1 and 52-2. Since there are four active FSW boards, the switch arrangement provides eight 8×8 switches 52. Each FI/O board 34 makes connections 44 eight fabric switches 52. The interconnect scheme and decoupling of FSW boards provide point to point connections between the user ports.

Heretofore, when a user needed to upgrade a switching operation in terms of size and/or capacity, such upgrade required either purchase of a completely new unit, and/or substantial modification of an existing smaller capacity switch architecture, requiring many technician hours as well as technical know-how. The present switch architecture, on the other hand, is capable of being expanded by a simple operation, for example, 64 user ports to 128, to 256 and so on. In particular, whenever additional FI/O boards with eight user ports have traffic to offer for a switch in its totality, these FI/O boards can be matched with eight switches having proper switch connectivity for delivering fibre channel frames to any desired or predetermined destination user port(s). In addition, it is desirable to set up the distribution architecture to minimize congestion through the switch.

Architecturally, an embodiment of a backplane in accordance with the present invention provides connectivity for multiple switch sizes. As described further herein, the backplane includes connectors to receive and connect intra-chassis and inter-chassis FI/O and FSW boards. The connectors are configured to provide two sets of connections between each FI/O board and FSW boards on the backplane. The first set of I/O connections are hard wired permanent connections and the second set of connections are jumper connections. Using jumper plugs and cables, the jumper connections can be configured to make I/O interconnections between the FI/O boards and FSW boards of different backplanes to expand the switch size. In particular, the connectors are configured to provide connections between FSW boards and FI/O boards of other backplanes. For different switch sizes, the connectors on the backplanes are configured to provide proper switch connectivity for each FSW and maintain point to point connections between FSW and FI/O boards. The backplane can also receive a spare fabric switch. In the event of a failure of a switch, the backplane wiring allows the FI/O boards to switch two sets of I/O connections to the spare switch.

In the case of a single chassis switch supporting up to 64 user ports, the backplane receives eight FI/O boards having eight user ports and four active FSW boards, each having 16×16 switch connectivity. Each FSW board is logically decoupled into two logical switches, each with 8×8 switching capacity. These eight switches with 8×8 switching capacity permit one point to point connection to each of the eight FI/O. The connectors are configured so that jumper connections are made between the FI/O and four of the logical switches. The permanent and jumper connections provide two sets of connections between each FI/O board and FSW boards. Since there are two sets of I/O connections, i.e., permanent and jumper connections, and two logical switches on each FSW board, each FI/O board is connected to the FSWs with 8×8 switch connectivity.

Two 64 port chassis assemblies according to the present invention can provide a 128 port capacity switch. The chassis assemblies provide 16 FI/O and 8 FSW boards. Contrary to the 64 port configuration, the FSW boards are not logically decoupled and provide 8 switches with 16×16 switching capacity to ensure point to point connectivity between 128 user ports provided by the FI/O boards. As in the 64 port configuration, the permanent connections provide a set of connections between each FI/O board and the switches of each chassis. However, the connectors are configured so that jumper connections in the first chassis provide interconnections between each FI/O board of the first chassis and the switches of the second chassis. Similarly, jumper connections in the second chassis provide interconnections between each FI/O board of the second chassis and the switches of first chassis. These interconnections between the first and second chassis are made using jumping plugs or cables, as described further herein.

The 256 port capacity configuration requires switches with 32×32 switching capacity. An embodiment of a backplane in accordance with the present invention has the necessary connectivity to support eight such switches distributed over four 64 port chassis assemblies. In each chassis, two FSW board positions are logically coupled to provide one FSW with the connections needed to effect 32×32 switching capacity. The four chassis assemblies thus provide eight such FSWs. The connectors are configured so that each switch of first chassis has permanent connections to the FI/O boards of the same chassis, vertical or jumper connections to the FI/O boards of second chassis, diagonal connections to the FI/O boards of third chassis, and horizontal connections to the FI/O boards of fourth chassis. Similarly, each fabric switch in other chassis are interconnected to the FI/O boards.

Having described the connectivity for multiple switch sizes, details of the backplane interconnections are now described.

Figure 6:
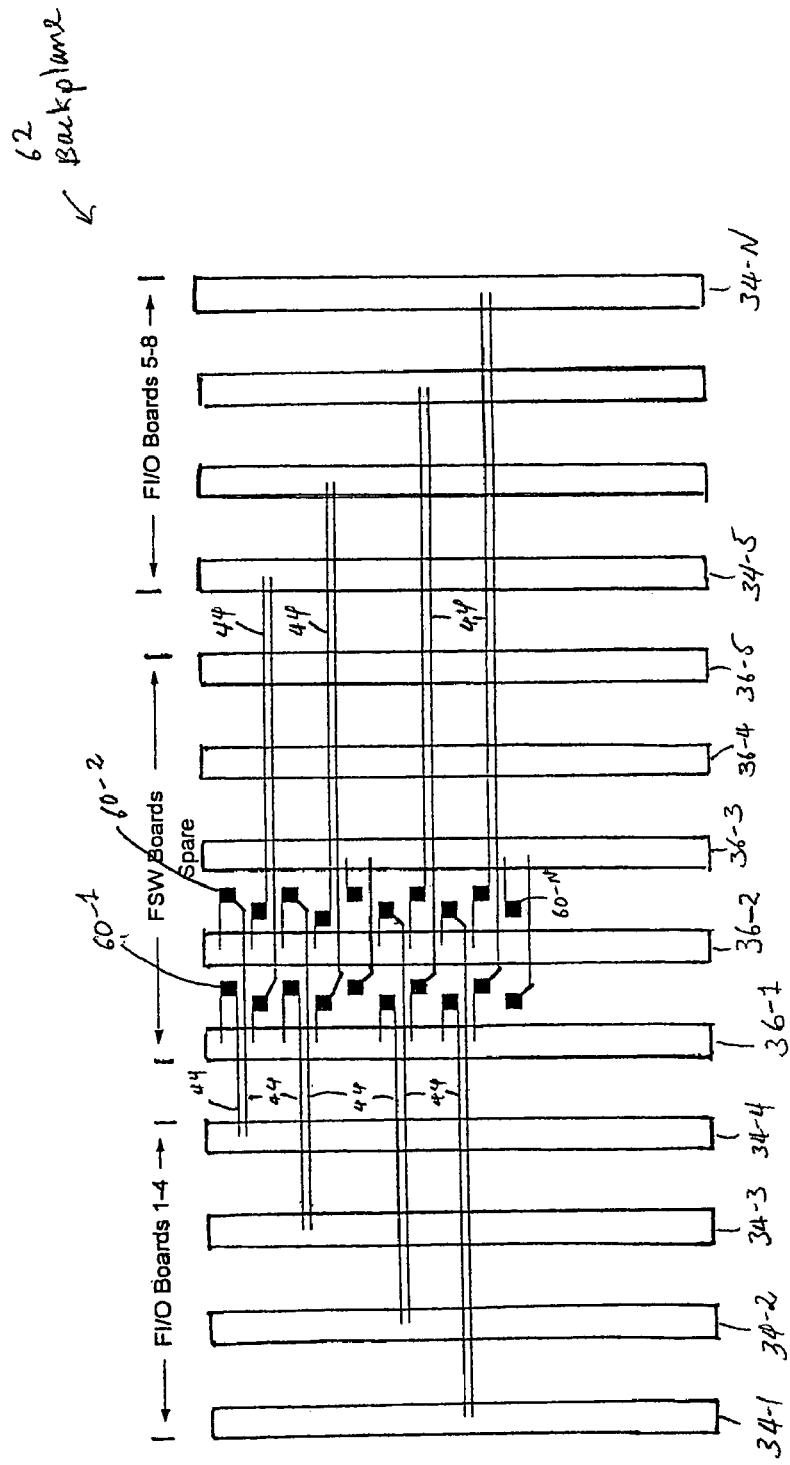
FIG. 6 is a block diagram of a backplane of the chassis of FIG. 3, illustrating connections between fibre channel I/O boards and fabric switch boards.

FIG. 6 is a block diagram of a backplane 62 of the chassis of FIG. 3, illustrating connections 44 between FI/O boards 34 and FSW boards 36. The backplane 62 is capable of receiving eight FI/O boards 34 and five FSW boards 36, including four active 36-1, 36-2, 36-4, and 36-5 and one spare 36-3. This configuration illustrates connections of FSW boards 36-1 and 36-2 to each FI/O board of the backplane 62. Similar connections to each FI/O board are arranged for the remaining FSW boards. The connection sites or ports 60 illustrate the point of connection between a port of a FI/O board 34 and a port of a FSW board 36. Each connection site has a number of connector pins to make a set of input/output connections between FI/O and FSW boards.

FIG. 7 is a block diagram illustrating a backplane interconnect configuration according to the invention. The backplane 62 includes jumper connection sites 80-1, permanent connection sites 86-1, and switch expansion sites 82-1 for each FSW board 36-1. These connection sites include connectors to make connections and interconnections between FSW 36 and FI/O boards 34 received on one or more backplanes for providing multiple switch sizes.

Each FSW board 36 makes two sets of connections 81 and 87 to the FI/O boards of the backplane. For example, FSW board 36-1 makes one set of I/O connections 87-5 with FI/O boards 34-1 through jumper connection sites 80. Another set of I/O connections 81-1 are made through permanent connection sites 86-1. Similarly, the FI/O boards have two sets of connections to the spare FSW board 36-3 through the permanent 86 and jumper connection sites 80. The first of these connections through permanent connection sites 86 can be wired in the backplane to the spare FSW board 36-3. The second set of connections through jumper connection sites 80 can be made, for example, by way of a configuration plug. The configuration plug generally handles two connections to the spare FSW board 36-3. In a 128 port switch having two chassis, a second chassis can use the second set of connections through jumper connection sites 80 for access to the spare FSW board 36-3.

Another way to provide the FI/O boards 34 with at least two sets of connections to the spare FSW board 36-3 is to use a 10×10 crossbar switch. The inputs to the crossbar are the back-up driver from each output port and the two outputs from the spare FSW board. Outputs from the crossbar are the two outputs to the spare FSW and one output to each of the backup inputs of the port receiver.

The permanent and jumper connections 87 and 84 between FSW 36 and FI/O 34 comprise differential pairs operating at 1.0625 Gigabits per second. Preferably, all wiring is point to point with no stubs or multi-point connections. Pairs driving from FI/O 34 to FSW 36 have one driver connected to the backplane and another driver connecting to the crossbar switch, thus using eight inputs to the crossbar. The signals on the FI/O 34 from the spare switch 36-3 are connected to the crossbar inputs, thus using the remaining two inputs. Two outputs of the crossbar drive the spare position switch. The signal receivers on the FI/O are dual pair inputs with 2 to 1 multiplexer to select one of the two inputs. One input of each receiver is connected via the backplane to a FSW. The second input to each receiver is connected to an output of the crossbar. Thus, point to point connectivity is maintained, the output to any FSW may be re-directed to the spare FSW and the outputs of the spare FSW may be directed to replace the input from any FSW.

Figure 8A:
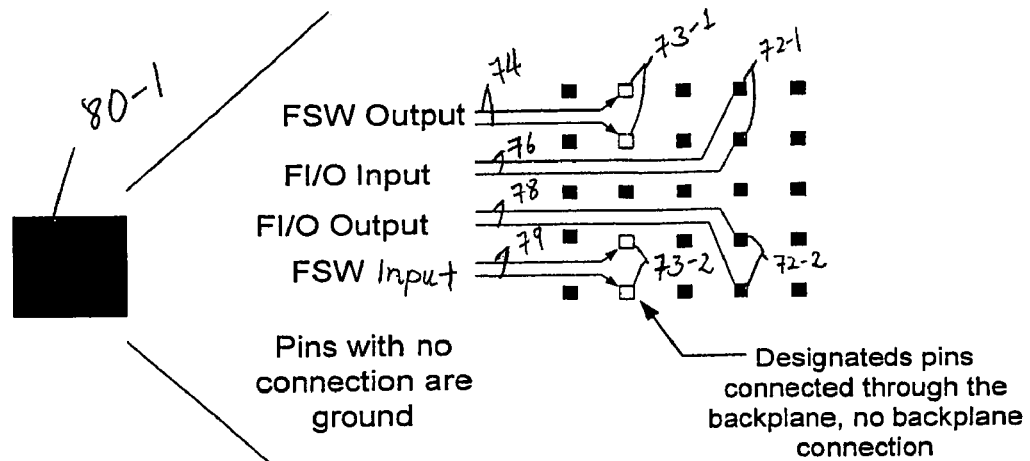
FIGS. 8A–8B are detailed block diagrams of a jumper connection site of FIG. 7, illustrating connector pin patterns and interconnect configuration for intra-chassis and inter-chassis connections.
Figure 8B:
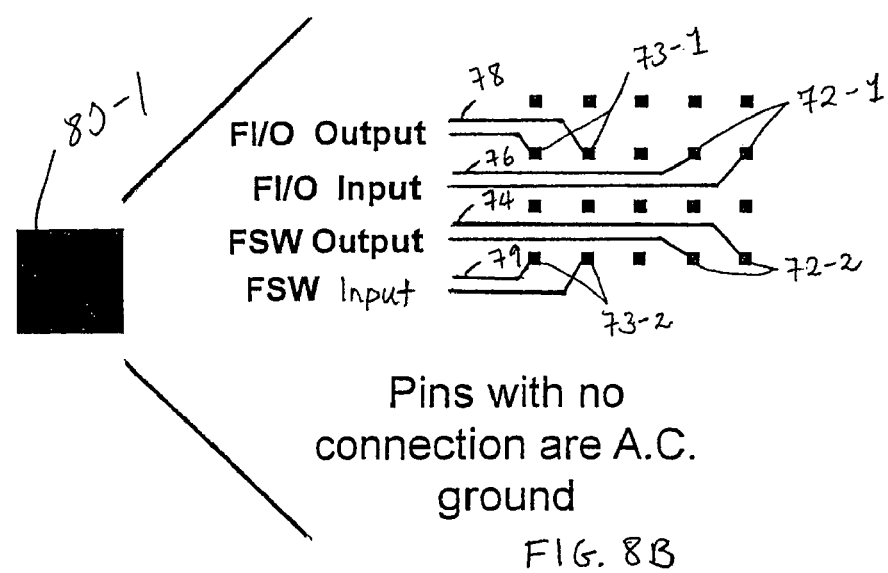

FIGS. 8A–8B are detailed block diagrams of a jumper connection site 80 of FIG. 7, illustrating connector pin patterns and interconnect configuration for intra-chassis and inter-chassis connections. FIG. 8B illustrates an alternative signal to ground configuration for additional isolation. FI/O input and output connector pins 72-1 and 72-2 provide differential pair FI/O input and output connections 76 and 78 to a FI/O board 34-1 (FIG. 7). FSW input and output connector pins 73-1 and 73-2 provide FSW input and output connections 74 and 79 to a FSW 36-1 (FIG. 7). These connectors 72 and 73 at jumper connection site are also referred to as jumper connectors. The jumper connectors 72 and 73 are straight-through connectors that use loopback cards to connect to other connectors on the same backplane or use jumper plugs or cables to interconnect to connectors of another backplane. For example, in a 64 port configuration, loopback plugs are used to connect between FI/O and FSW input and output connectors pins 72-1, 72-2 and 73-1, 73-2 thereby providing connections between FSW and FI/O boards of the same backplane.

In a 128 port configuration, two 64 port chassis are used. Jumper plugs are used to connect between FI/O input and output connector pins 72-1 and 72-2 to corresponding FSW input and output connectors of second chassis, and thereby providing inter-chassis connections between a FI/O board of first chassis and a fabric switch of second chassis. Similarly, using jumping plugs, FSW input and output connector pins 73-1 and 73-2 can make connections to corresponding FI/O input/output connectors of second chassis, and thereby providing connections between a FI/O port of second chassis and a FSW of first chassis. These inter-chassis connections provided by jumper connection sites/ports between the FI/O board of first chassis and FSW of second chassis and between the FSW of first chassis and FI/O board of second chassis are also referred to as vertical connections.

AMP 2 mm connectors, well known in the industry, can be used for this application, however, other similar or different connectors could be used if desired. Five row 2 mm AMP connectors of this pin count will typically occupy approximately 4.75 inches of board space.

The connector pins designated as ground may be used for power distribution or as static configuration pins to indicate if a plug is installed, switch size and which chassis is involved. Connector pins with no designated connection are A.C. ground. The center vertical column is typically used for cable shields and desirably are grounded. In addition, inputs and outputs can be routed on different layers to provide better signal isolation and pair length match if necessary or desired for any reason.

Figure 9:
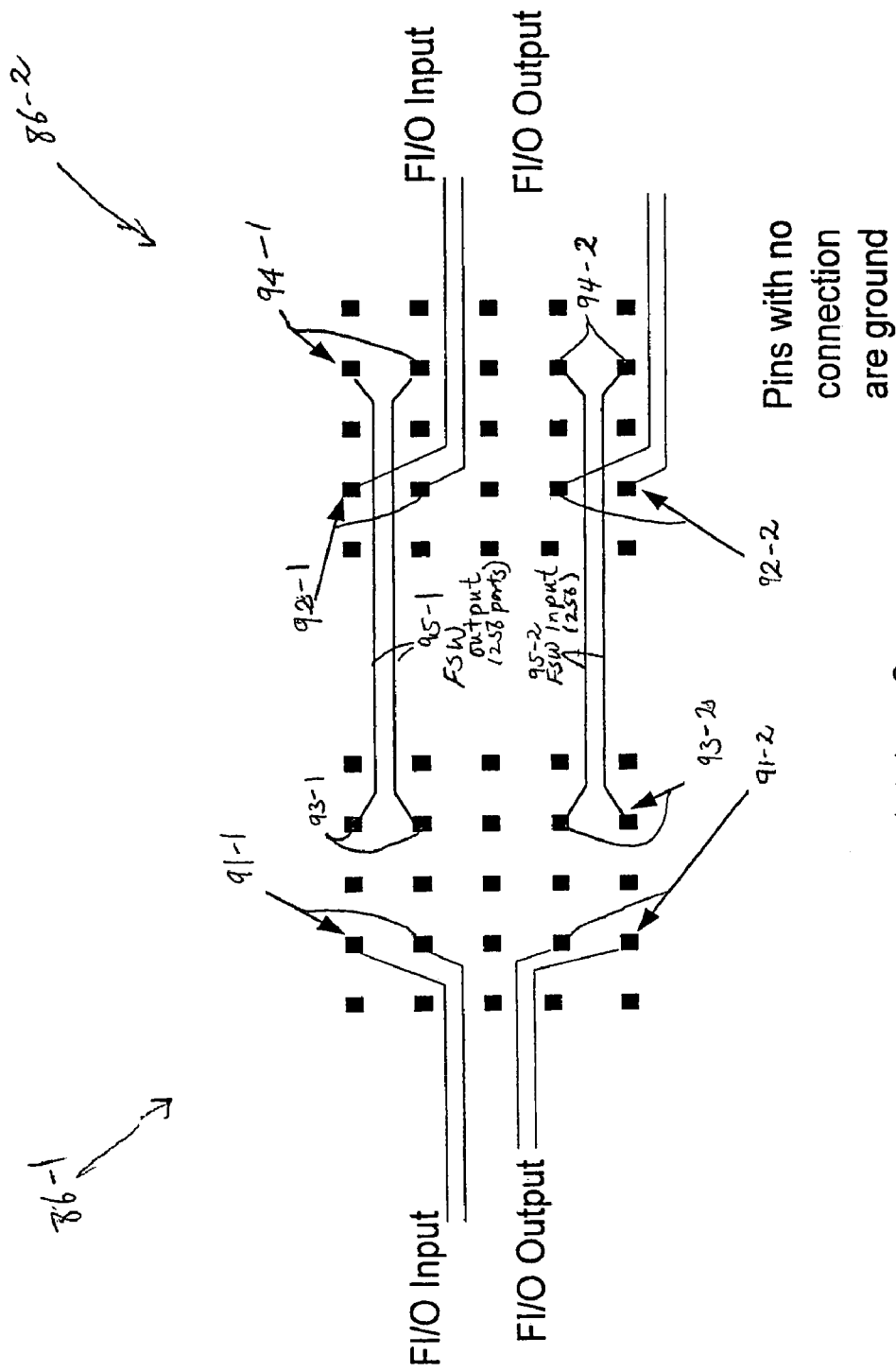
FIG. 9 is a detailed block diagram of permanent connection sites of adjacent fabric switch boards in FIG. 7, illustrating pin patterns and interconnect configuration for intra-chassis and inter-chassis connections.

FIG. 9 is a detailed block diagram of permanent connection sites 86-1 and 86-2 of adjacent fabric switch boards 36-1 and 36-2 in FIG. 7, illustrating pin patterns and interconnect configuration for intra-chassis and inter-chassis connections. The connector pins of these permanent connection sites 86-1 and 86-2 are hard wired in the backplane 62 directly between FI/O input and output connectors 91-1, 91-2 and FSW board 36-1 received on the backplane 62. Similarly, FI/O input and output connectors 92-1 and 92-2 are hard wired to FSW board 36-2 received on the backplane 62. So, jumper plugs or cables are not needed to connect the FI/O to the received FSW. For example, the FI/O input and output connectors 91-1 and 91-2 provide input/output connections 81-1 (FIG. 7) between the FSW board 36-1 and the FI/O board 34-1. Since these connectors 91 are hard wired to FSW board 36-1, permanent connections between the FI/O board 34-1 and the FSW board 36-1 are made. Similarly, the FI/O input and output connectors 92-1 and 92-2 provide permanent connections between the FI/O board 34-1 and the FSW 36-1.

The pin connection pattern is similar to jumper connection site pin patterns, except that FI/O input and output connect directly to port logic on the FSW boards.

The permanent connection sites 86-1 and 86-2 also include connectors 93-1, 93-2, 94-1, and 94-2 used to configure a 256 port switch but reserved in 64 and 128 port switches. These links are typically reserved in 64 and 128 port switches. The FSW boards for 64 and 128 port switches should generally make no connection to these connectors 93 and 94. These connectors 93 and 94 extend through the backplane since they provide interconnections.

In a 256 port configuration, four 64 port chassis are used. As in the 128 port configuration, each FSW has permanent intra-chassis connections to the FI/O boards in the same chassis and vertical inter-chassis connections to the FI/O boards in the second chassis. In addition, as discussed above, two adjacent FSW boards are arranged to provide one 32×32 FSW. In this embodiment, the FSW board slot 36-1 is provided with a FSW board having a switch. However, the FSW board slot 36-2 is provided with a similar FSW board without a switch.

The connectors 93-1, 93-2 and 94-1, 94-2, or horizontal FSW input and output connectors, provide FSW input/output connections 95-1 and 95-2 to a FI/O board in the third chassis. The horizontal FSW input/output connectors 93-1, 93-2, 94-1, and 94-2 provide FSW input/output connections between the permanent connection sites 86-1 and 86-2 of FSW boards 36-1 and 36-2. Using jumper plugs, the horizontal FSW input/output connectors 94-1 and 94-2 are also connected to corresponding FI/O board input/ output connectors of the third chassis. Similarly, the permanent FI/O input/output connectors 92-1 and 92-2 are connected to a corresponding FSW board of third chassis. These inter-chassis connections between the first and third chassis provided by permanent connections sites are also referred to as horizontal connections.

Figure 10:
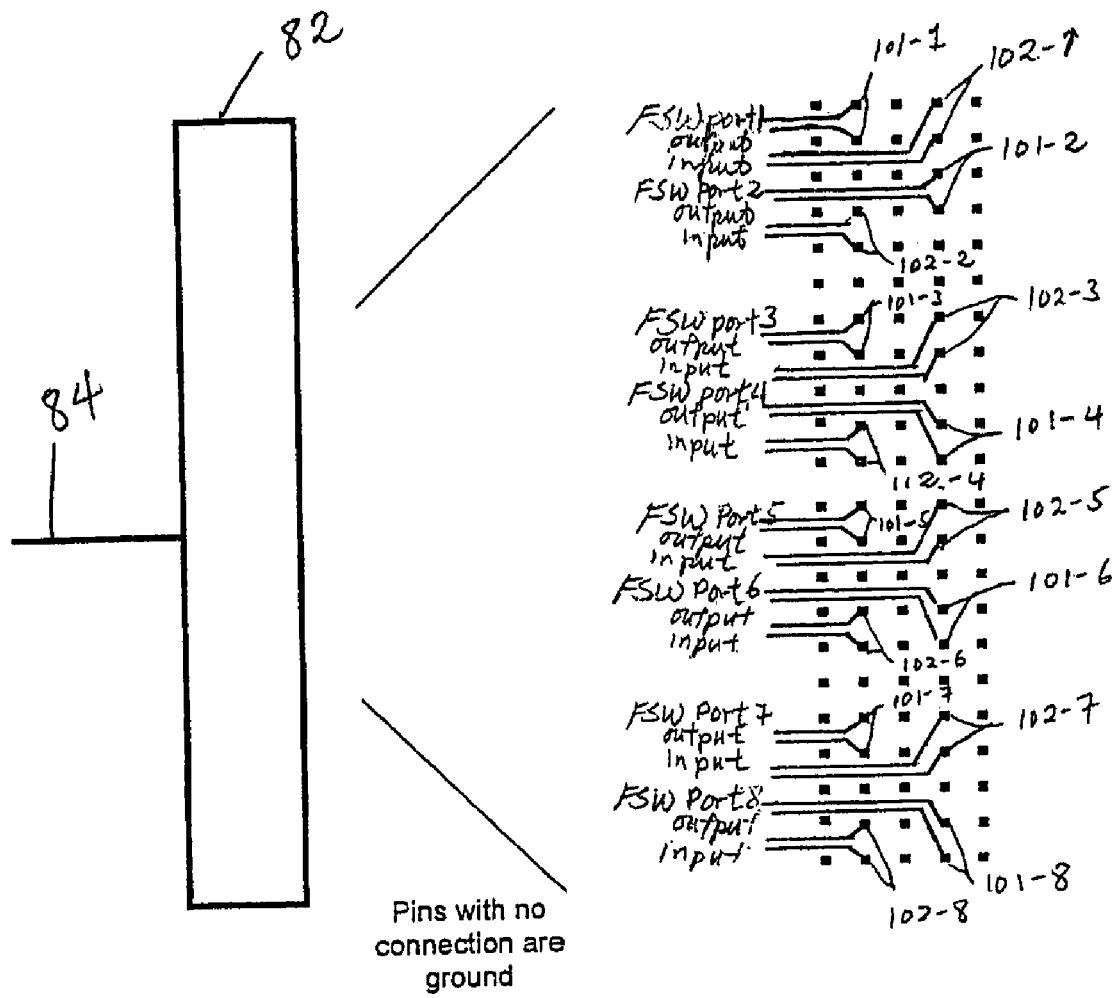
FIG. 10 is a detail block diagram of a switch expansion site of FIG. 7, illustrating pin patterns and interconnect configuration for connections between fabric switch boards.

FIG. 10 is a detail block diagram of a switch expansion site 82 of FIG. 7, illustrating pin patterns and interconnect configuration for connections between fabric switch boards. The expansion connection sites 82 represent connectors used to connect 8 jumper connection sites/ports between FSW slot 36-1 and 36-2 to provide diagonal connections to the fourth chassis in the 256 port configuration. The connectors are wired by way of an interconnect card plugged into the otherwise vacant FSW position. These links are typically reserved in 64 and 128 port switches. Eight sets of connectors 101 and 102 provide FSW input and output connections to the FI/O boards of the fourth or diagonal chassis. These connectors are not used for 64 or 128 port switches.

As shown in FIG. 9, the permanent connection sites/ports of FSW 36-2 provide horizontal connections to the third chassis. Similarly, the jumper connection sites/ports provide diagonal connections to the fourth chassis. The expansion connection sites or diagonal FSW connection sites 82-1 and 82-2 provide diagonal FSW input/output connections 84 provided by the FSW board 36-1. For example, FSW input/output connectors 101-1 and 102-2 provide connections between a port of FSW 36-1 and a port of the FSW board 36-2. In addition, the FSW input and output connectors 101-1 and 102-1 are diagonally connected to the corresponding FI/O board of fourth chassis. Similarly, jumper FI/O input and output connectors 72-1 and 72-2 (FIGS. 8A and 8B) are diagonally connected to the corresponding FSW in the fourth chassis. Thus, inter-chassis connections between the first and fourth chassis are provided.

As described above, for backplanes configured as in FIG. 7, a 64 port single chassis is configured by making permanent and jumper connections between the FI/O 34 and FSW boards 36. The 64 port single chassis includes eight FI/O boards and four active FSW boards having 16×16 switch connectivity. Each FI/O board provides eight user ports. Each active FSW board is logically arranged into two switches with 8×8 connectivity, so that the top half of an FSW board represent one switch and the bottom half represents another switch.

As shown in FIG. 7, the permanent connections provide point to point connections between each FI/O board 34 and four FSW located at the bottom of the FSW boards 36. For the other FSW located at the top half of the FSW boards, the connectors at the jumper connection sites are configured, so that jumper plugs or loopback cards can be used to make connections between the FI/O boards and the rest of FSW. An additional plug or card should make a connection to a connector to allow control electronics on the FSW to recognize that it is a single chassis switch.

For a 128 port configuration, two 64 port chassis assemblies 30-1 and 30-2 are used. The FSW boards 36 in the chassis assemblies are not decoupled and provide eight active and two spare switch having 16×16 switch connectivity.

As in the 64 port configuration, the permanent connections provide point to point connections between the FI/O boards and FSW in the same chassis. However, the jumper connectors are configured, so that jumper connections are made between switches in the first chassis 30-1 and FI/O boards in the second chassis 30-1 to provide point to point connectivity between the user ports. The loopback cards in the 64 port configuration are replaced with jumper plugs or cables to connect eight FI/O boards 34 of the first chassis 30-1 to four FSW in the second chassis 30-2. For example, in a jumper connection site 80 (FIG. 8A), jumper plugs connect the FI/O input/output connectors 72 in first chassis 30-1 to FSW input/output connectors in a corresponding jumper connection site 80 of second chassis 30-2. Likewise, the jumper must connect the FI/O circuits of second chassis 30-2 to the FSW ports in first chassis 30-1. The connections to the spare FSW are also distributed to second chassis. The jumper should preferably identify the fabric of the first chassis 30-1 as switch 1-4 and those of second chassis 30-2 as switch 5-8. The configuration can require four jumper assemblies. Since these jumper assemblies require 46 pair, they can be split into two or more physical cables.

Figure 11:
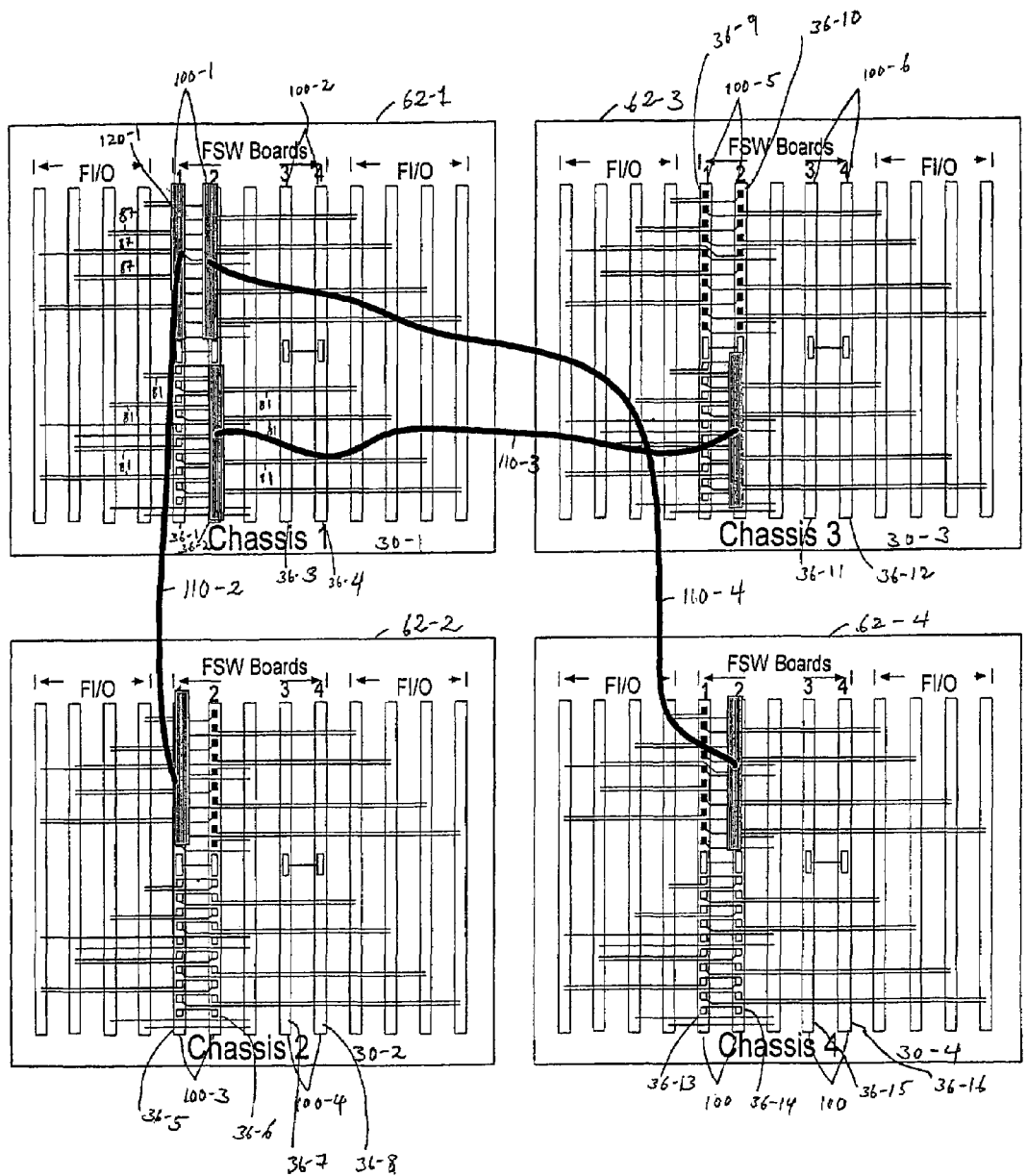
FIG. 11 is a block diagram illustrating an interconnect configuration between chassis to expand a fibre channel switch.

FIG. 11 is a block diagram illustrating an interconnect configuration between chassis to provide a 256 fibre channel switch. In particular, the diagram illustrates how a FSW in the first chassis 30-1 is connected to FI/O boards of the first chassis 30-1 and other chassis 30-2, 30-3, and 30-4. The 256 port switch comprises four 64 port chassis 30-1, 30-2, 30-3 and 30-4. The chassis can be in two side by side cabinets, each cabinet having two chassis. Each chassis supports two 32×32 FSW.

Further, the fabric switch 100-1 is connected to the FI/O boards of the first chassis 30-1 via permanent connections 81 and each of the remaining three chassis 30-2, 30-3, and 30-4 of the system via cables 110-2, 110-3, and 110-4. As in 64 and 128 port switch configurations, the switch 100-1 makes connections to the FI/O boards of the same chassis 30-1 via permanent connections 81.

The connections between the switch 100-1 and FI/O boards of the second chassis 30-2 are made through a cable 110-2. Except for configuration jumpers, the cable 110-2 can be the same as used in a 128 port switch. The cable 110-2 is also referred to as vertical connectivity cable. The vertical connectivity cable 110-2 connect between a block 120-1 of the first FSW board jumper ports of first chassis 30-1 and corresponding block of jumper ports of FSW 100-3 of second chassis 30-2. As a result, the connections 87 between the FI/O boards and jumper ports of the first FSW board 36-1 in the first chassis 30-1 are extended to a corresponding FSW 100-3 in the second chassis 30-2. Thus, connections between the switch 100-3 of the second chassis and FI/O board of the first chassis are provided. Similarly, the connections 87 between the board jumper ports 80 of FSW board 36-6 and the FI/O boards in the second chassis 30-2 are extended to the switch 100-1 of the first chassis 30-1, and thus provides connections between the FSW 100-1 of the first chassis 30-1 and FI/O boards of the second chassis 30-2.

The second FSW board 36-2 of FSW 100-1 is not populated with a switch board. However, similar to a switch board, the backplane provides permanent connections 81 and jumper port connections 87 between the second FSW board 36-2 and the FI/O boards of first chassis 30-1. The permanent connections 81 of second FSW board 36-2 are extended via horizontal connectivity cable 110-3 to make connections between the FI/O boards of first chassis 30-1 and FSW 100-5 of third chassis 30-3. The jumper port connections 87 of second FSW board 36-2 are extended via diagonal connectivity cable 110-4 to make connections between the FI/O boards of first chassis 30-1 and FSW 100-7 of fourth chassis 30-4.

Similarly, the first FSW 100-1 of first chassis 30-1 makes connections to FI/O boards of third chassis 30-3 via horizontal connectivity cable 110-3. The permanent connections 81 between the second FSW board 36-10 of FSW 100-5 and FI/O boards in third chassis 30-3 are extended to FSW 100-1 of first chassis 30-1. The horizontal cable 110-3 connects between the permanent port block 130-10 of second FSW board 36-10 and permanent port block 130-2 of corresponding second PSW board 36-2 in the first chassis 30-1. Since the second FSW board 36-2 is not a switch board, the connections to FI/O boards of third chassis 30-3 are further extended to first FSW board 36-1. The horizontal FSW input/output connections 95-1 and 95-2 between the permanent ports of FSW boards 36-1 and 36-2, as shown in FIG. 9 provide this extension of horizontal connections.

The first FSW 100-1 of first chassis 30-1 makes connections to FI/O boards of fourth chassis 30-4 via diagonal connectivity cable 110-4. The jumper port connections between the second FSW board 36-14 of FSW 100-7 FI/O boards in the fourth chassis 30-4 are extended to FSW 100-1. The diagonal cable 110-4 connects between the jumper port block 120-14 of second FSW board 14 and jumper port block 120-2 of corresponding second FSW board 36-2 in the first chassis 30-1. Further connections to the first FSW board 36-1 are provided in the expansion connector sites (FIG. 10) in the respective FSW slots for the first and second FSW boards 36-1 and 36-2. The fabric input and fabric output connect between adjacent FSW boards shown in the center of FIG. 8 provide the necessary resources to extend diagonal connections to between first and fourth chassis 30-1 and 30-4.

A further desirable aspect of the present invention is that the expansion connector sites 82 contain a passive interconnect plug. The passive interconnect plug can connect FSW inputs 73-3 and 73-4 and FSW outputs 73-1 and 73-2 of the connector patterns of FIG. 8A to the FI/O inputs 102 and FI/O outputs 101 of the expansion connectors 103 in FIG. 10, thereby permitting all cable assemblies to have wiring configurations wherein only configuration jumper connections vary. The interconnect plug can also distribute spare ports to the spare pins of the expansion connector.

In addition, one chassis contains the spare switch board connecting to the eight local FI/O Switch boards and distributes eight ports of connectivity to each of the remaining three chassis. Connections between chassis preferably take place from three physical locations associated with each FSW board.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fibre channel switch comprising:
    a first set of input/output modules, each input/output module having a plurality of fibre channel ports;
    a first set of fabric switch modules to provide connections between the fibre channel ports;
    a first backplane receiving the first set of input/output modules and the first set of fabric switch modules, the backplane having connectors to provide connectivity between the first set of input/output modules and the first set of fabric switch modules;
    a second backplane receiving a second set of input/output modules and a second set of fabric switch modules and connectors providing connectivity between the second set of input/output modules and the second set of fabric switch modules, each input/output module of the second set having a plurality of fibre channel ports: and
    a first connection between the second set of input/output modules and one of the first set of fabric switch modules bypassing the second set of fabric switch modules, thereby allowing the one of the first set of fabric switch modules to provide direct connections to the fibre channel ports on the second set of input/output modules without the direct connections passing through any of the second set of fabric switch modules.

2. The fibre channel switch of claim 1 wherein the first connection utilizes jumper plugs.

3. The fibre channel switch of claim 1 wherein the first and second sets of input/output modules provide up to 128 fibre channel ports.

4. The fibre channel switch of claim 1 further comprising third and fourth backplanes having the third and fourth sets of input/output modules.

5. The fibre channel switch of claim 4 further comprising second and third connections between the one of the first set of switch modules and the third and fourth input/output modules respectively to provide up to 256 fibre channel ports and to allow the one of the first set of fabric switch modules to provide direct connections to the fibre channel ports on the third and fourth set of input/output modules.

6. The fibre channel switch of claim 1 wherein each fabric switch module provides a switch having 16×16 switch connectivity.

7. The fibre channel switch of claim 1 wherein each of said fabric switch modules are logically decoupled into two separate logical switches.

8. The fibre channel switch of claim 1 wherein said fabric switch module receives fibre channel frames at speeds of at least one gigabit per second.

9. The fibre channel switch of claim 1 wherein at least one of the plurality of fabric switch modules is a redundant fabric switch module.

10. The fibre channel switch of claim 1 wherein the first set of connections is provided by through backplane pins.

11. The fibre channel switch of claim 1 wherein the plurality of fabric switch modules are crossbar switches.

12. A fibre channel switch comprising:
a first chassis including:
a plurality of input/output modules, each input/output module having a plurality of fibre channel ports;
a plurality of fabric switch modules forming at least one switch to provide connections between the fibre channel ports;
a backplane receiving the plurality of input/output modules and the fabric switch modules, the backplane having connectors to provide connectivity between the input/output modules and the fabric switch modules of the first chassis;
a second chassis also having a plurality of input/output modules and a plurality of fabric switch modules, the input/output modules of the second chassis having a plurality of fibre channel ports; and
a connection bypassing the fabric switch modules of the second chassis by providing direct communication between the input/output modules of the second chassis and the fabric switch modules of the first chassis, thereby allowing the fabric switch modules of the first chassis to provide direct connections to the fibre channel ports on the input/output modules of the second chassis without the direct connections passing through any of the fabric switch modules of the second chassis.

13. The fibre channel switch of claim 12 wherein the connectors provide two sets of connections between each input/output module and the plurality of fabric switch modules in the first chassis.

14. The fibre channel switch of claim 13 wherein each fabric switch module provides two switches, each switch having one of said two sets of connections to the input/output modules.

15. The fibre channel switch of claim 14 wherein the fibre channel switch provides up to 64 fibre channel ports.

16. The fibre channel switch of claim 13 further comprising a plurality of loopback plugs for one of said two sets of connections.

17. The fibre channel switch of claim 12 wherein the fibre channel switch provides up to 128 fibre channel ports.

18. The fibre channel switch of claim 15 wherein each fabric switch module provides one switch.

19. The fibre channel switch of claim 17 wherein the connectors are configured to provide a first set of connections between the input/output modules and the fabric switch modules of the first chassis.

20. The fibre channel switch of claim 19 wherein the connection utilizes a plurality of jumper plugs.

21. The fibre channel switch of claim 12 further comprising a third and fourth chassis to provide up to 256 fibre channel ports.

22. The fibre channel switch of claim 12 wherein a plurality of connectors in each chassis are horizontal fabric switch connectors providing horizontal connectivity to the at least one switch.

23. The fibre channel switch of claim 21 wherein the at least one switch in each chassis has one set of connections to the input/output modules of each chassis.

24. A fibre channel switch comprising:
a) at least one chassis having:
1) at least one input/output module having a plurality of ports for receiving communications from outside the switch;
2) at least one switching module not having any ports for receiving communication from outside the switch, the switching module receiving communication only from the at least one input/output module, the switching module providing a plurality of communication paths between ports;
3) a hardwired connection directly between each input/output module and each switching module within a single chassis without the hardwired connection passing through any switching module or input/output module; and
4) a jumper connection leading from each input/output module and from each switching module directly to at least one jumper connection site without the jumper connection passing through any switching module or input/output module;
wherein the at least one jumper connection site can be configured to connect input/output modules to switching modules within the same chassis.

25. The fibre channel switch of claim 24, wherein two connections exist between each input/output module and each switching module within the same chassis.

26. The fibre channel switch of claim 25, wherein each switching module is a single physical module logically decoupled into two separate, equal-sized logical switches, with each logical switch having a single connection to each input/output module within the same chassis.

27. The fibre channel switch of claim 24, wherein the switch has two chassis, and the jumper connection sites are configured to connect each of the input/output modules of the first chassis with each of the switching modules in the second chassis.

28. The fibre channel switch of claim 27, wherein the jumper connection sites are configured to connect each of the switching modules of the first chassis with each of the input/output modules second chassis.

29. The fibre channel switch of claim 24, wherein the switch has four chassis, and each input/output module in each chassis is connected to all the switching modules in the four chassis, further wherein each switching module in each chassis is connected to all the input/output modules in the four chassis.

30. The fibre channel switch of claim 29, wherein each switching module consists of two physical modules logically coupled together into a single logical switch.

31. The fibre channel switch of claim 30, wherein
one half of the hardwired connections are used to connect the input/output modules of the first chassis to the switching modules of the first chassis, the second half of the hardwired connections are used to connect the input/output module of the first chassis to the switching modules of the second chassis; and the at least one jumper connection site in the first chassis is configured so that one half of the jumper connections are used to connect the input/output module of the first chassis to the switching modules of the third chassis, and so that the second half of the jumper connections are used to connect the input/output module of the first chassis to the switching modules of the fourth chassis.

* * * * *